No. 832,494. PATENTED OCT. 2, 1906.
H. C. MICHELL.
MANUFACTURE OF FLAKE MICA FROM MICA PLATES, CRYSTALS, OR NODULES.
APPLICATION FILED OCT. 8, 1901.

5 SHEETS—SHEET 1.

Witnesses.
C. W. Clement.
E. M. Olmsted.

Inventor
H. C. Michell
By Watson & Watson
his Attys

No. 832,494. PATENTED OCT. 2, 1906.
H. C. MICHELL.
MANUFACTURE OF FLAKE MICA FROM MICA PLATES, CRYSTALS, OR NODULES.
APPLICATION FILED OCT. 8, 1901.
5 SHEETS—SHEET 2.
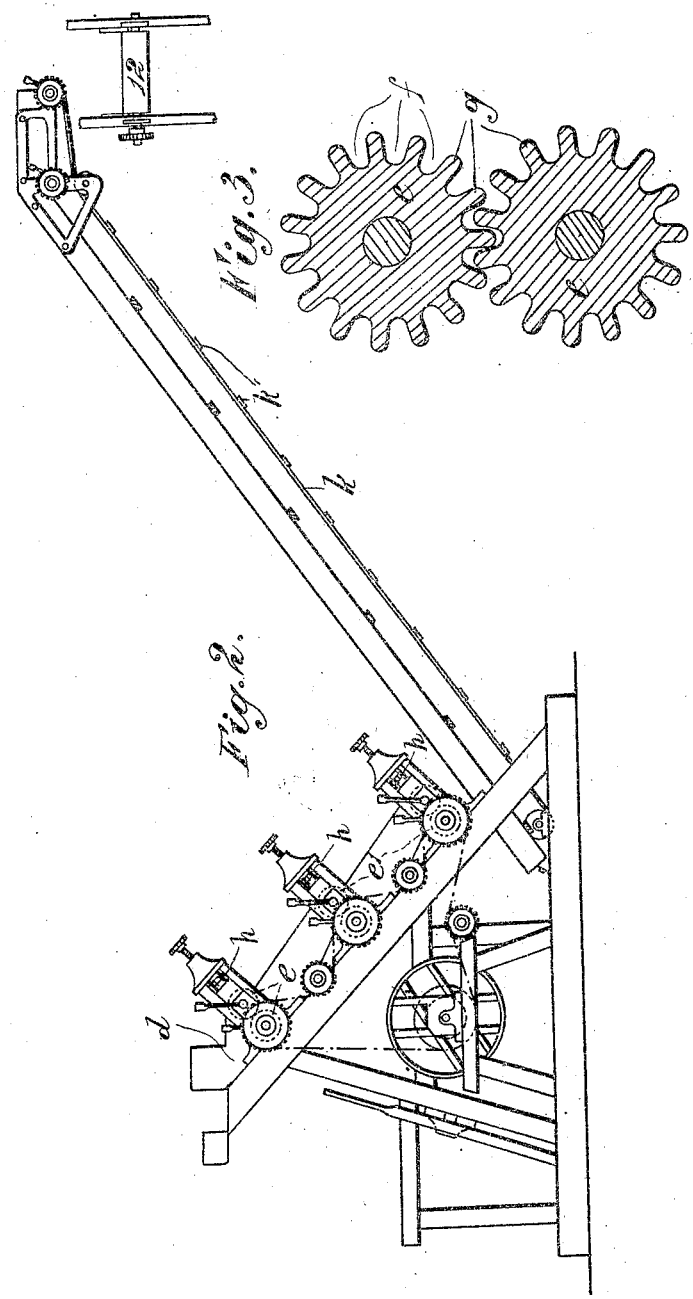

No. 832,494. PATENTED OCT. 2, 1906.
H. C. MICHELL.
MANUFACTURE OF FLAKE MICA FROM MICA PLATES, CRYSTALS, OR NODULES.
APPLICATION FILED OCT. 8, 1901.
5 SHEETS—SHEET 2.
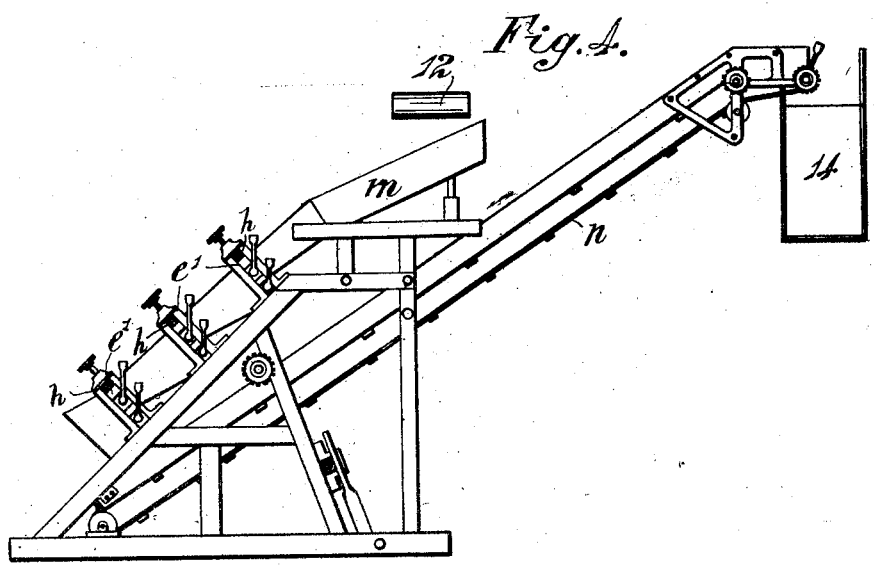
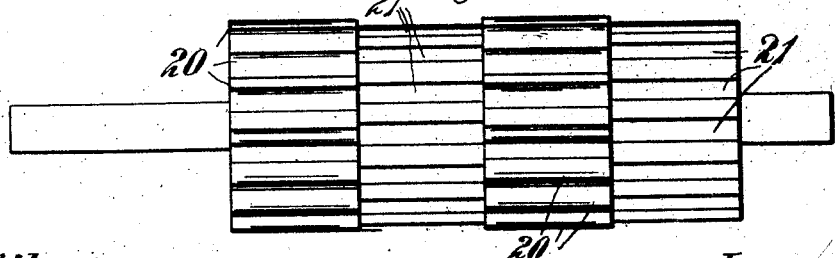
Witnesses.
C. W. Clement.
E. M. Olmsted.
Inventor
H. C. Michell
By Watson & Watson
his Attorneys No. 832,494. PATENTED OCT. 2, 1906.
H. C. MICHELL.
MANUFACTURE OF FLAKE MICA FROM MICA PLATES, CRYSTALS, OR NODULES.
APPLICATION FILED OCT. 8, 1901.

5 SHEETS—SHEET 4.

Witnesses
C. W. Clement.
E. M. Olmsted.

Inventor:
H. C. Michell
By Watson & Watson
his Attorneys

No. 832,494. PATENTED OCT. 2, 1906.
H. C. MICHELL.
MANUFACTURE OF FLAKE MICA FROM MICA PLATES, CRYSTALS, OR NODULES.
APPLICATION FILED OCT. 8, 1901.

5 SHEETS—SHEET 5.

Witnesses.
C. W. Clement
E. M. Olmsted

Inventor.
H. C. Michell
By Watson & Watson
his attorneys

UNITED STATES PATENT OFFICE.

HENRY COLBECK MICHELL, OF LONDON, ENGLAND.

MANUFACTURE OF FLAKE MICA FROM MICA PLATES, CRYSTALS, OR NODULES.

No. 832,494.   Specification of Letters Patent.   Patented Oct. 2, 1906.

Application filed October 8, 1901. Serial No. 77,987.

*To all whom it may concern:*

Be it known that I, HENRY COLBECK MICHELL, a subject of the King of Great Britain, residing at London, England, have invented certain new and useful Improvements in the Manufacture of Flake Mica from Mica Plates, Crystals, or Nodules, of which the following is a specification.

This invention has reference to the manufacture in a cheaper and more advantageous manner than heretofore of flake mica from mica plates, crystals, or nodules, (hereinafter called "mica plates,") more particularly from mica plates that are of too small a size or of too inferior a quality for the production therefrom of sheet-mica of the size and quality ordinarily required in commerce for electrical and other purposes. For this purpose the mica plates are treated in the improved manner and by the means hereinafter described with reference to and shown in the accompanying illustrative drawings, wherein—

Figure 1:
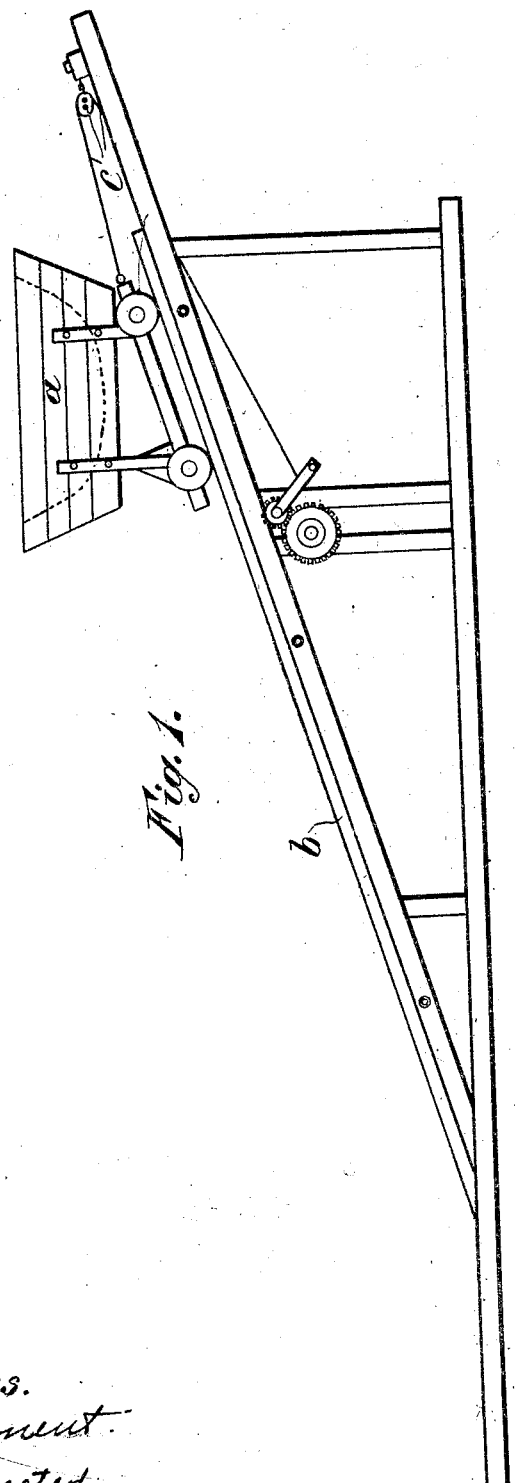
Figure 5:
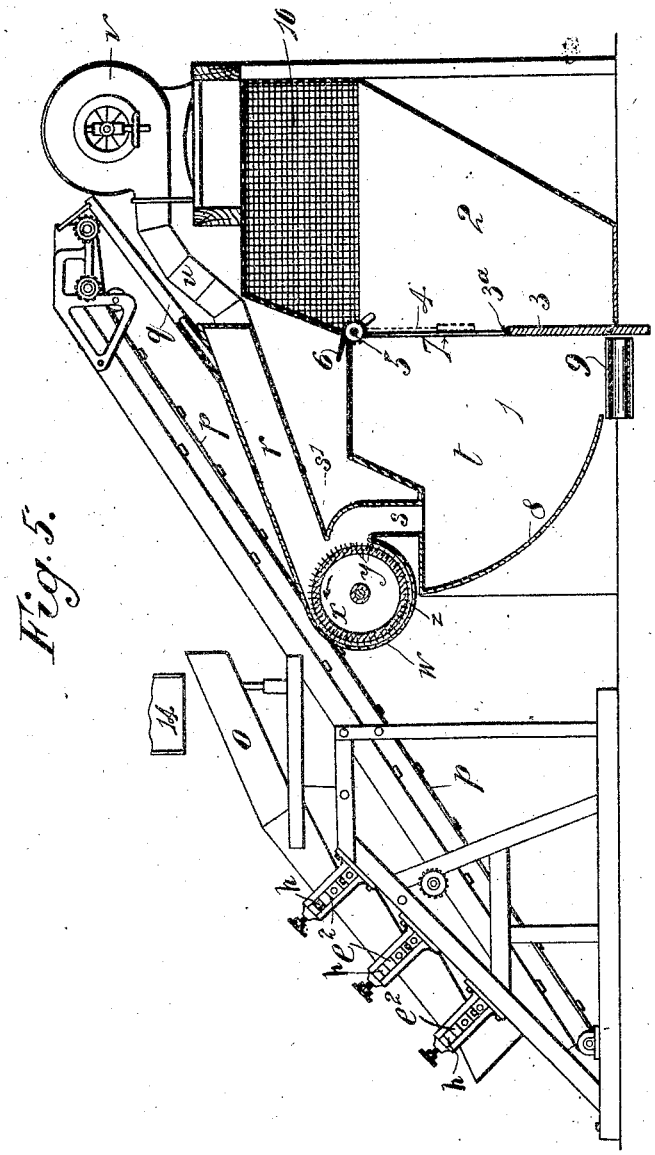
Figure 6:
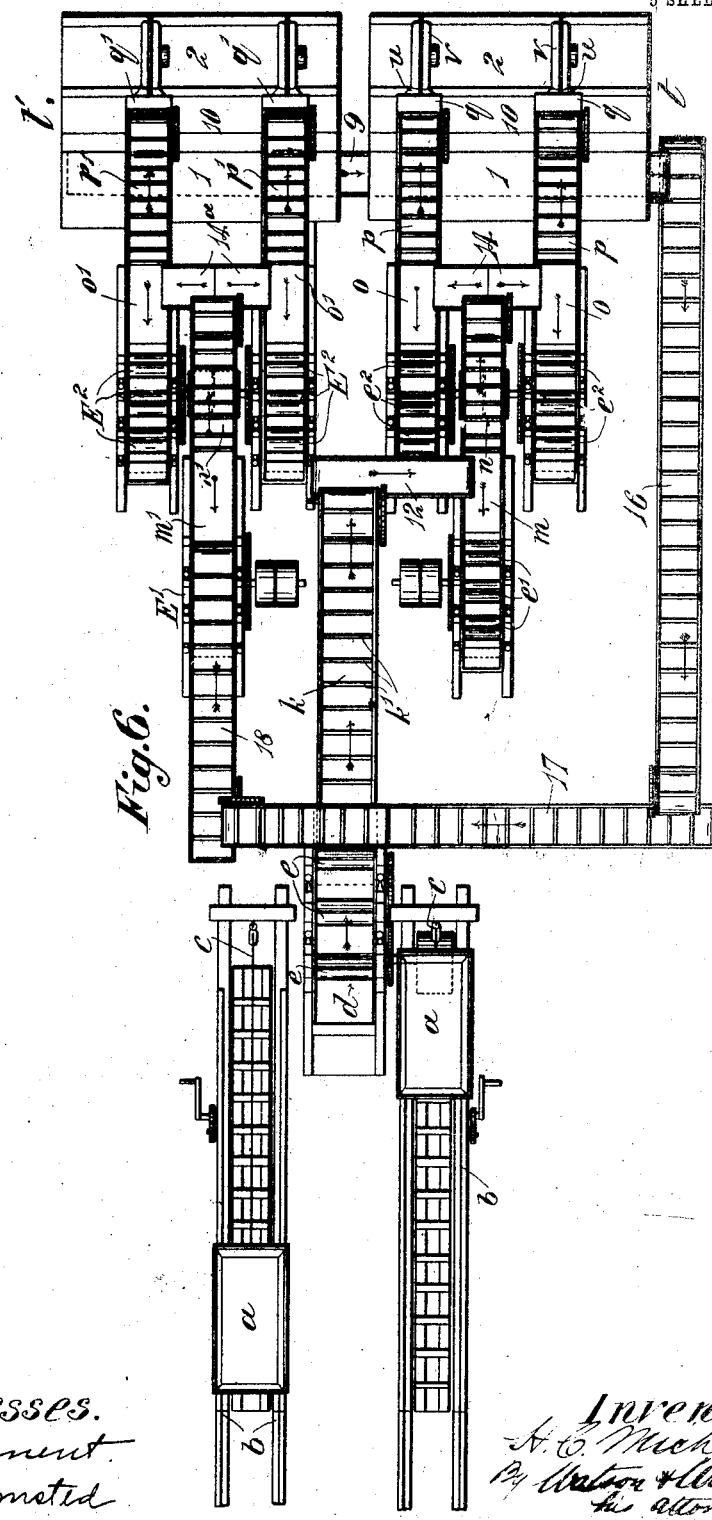

Figure 1 shows in side elevation an inclined way and means whereby a wagon containing mica plates to be treated can be raised to a sufficient height to admit of the said mica plates being delivered to the chute of the first set of bending-rolls. Fig. 2 shows in side elevation a chute with the first set of bending-rolls and an inclined conveyer and horizontal carrier whereby the mica plates after passing through the said first set of rolls can be raised and delivered to a second set of bending-rolls. Fig. 3 shows in cross-section and to a larger scale than Fig. 2 one of the pairs of bending-rolls shown in that figure. Fig. 4 is a similar view to Fig. 2, showing a chute with a second set of bending-rolls and an upwardly-inclined conveyer and lateral chute. Fig. 5 shows, partly in side elevation and partly in longitudinal vertical section, another chute with a third set of bending-rolls, an upwardly-inclined conveyer, and splitting and separating mechanism whereby the mica plates can, after being subjected to a preliminary bending treatment, be split so as to detach the laminæ composing such mica plates more or less from each other and separate the mica flakes from insufficiently-split portions of the plates. Fig. 6 is a plan showing how apparatus of the kind shown in Figs. 1 to 5, inclusive, can conveniently be arranged for causing the material to be treated after being raised and delivered to the chute of the first set of rolls to pass automatically through the several portions of apparatus, the said figure also showing means for returning partly-split mica plates to some of the bending-rolls for further treatment. Fig. 7 shows in plan a modified form of bending-roll.

According to this invention the mica plates, preferably after being first thoroughly dried, as by spreading them over a large surface in a drying-room heated to a sufficiently high temperature to expel all moisture, are subjected to a preliminary opening or loosening treatment whereby the laminæ of mica are more or less separated from each other. For this purpose the mica plates are raised—as, for example, by a wagon $a$ drawn up an inclined way $b$ by cord-and-pulley tackle $c$—and allowed to fall down an inclined chute or way $d$, Fig. 2, and pass by gravity between a pair of rolls $e$, that are of the full width of the chute and are formed with corrugated peripheries, the grooves $f$ and alternate ridges $g$ being arranged longitudinally of the rolls and so formed, as shown in Fig. 3, that the ridges $g$ on one roll will fit loosely in the grooves $f$ in the opposite roll of the pair. The pair of rolls $e$ are pressed together by springs $h$ and are so arranged and set that when the mica plates fall between them such plates will be firmly gripped between the rolls, in passing between which they will be subjected to a bending action whereby the edges of the mica laminæ composing the mica plates will be more or less loosened and partly separated from each other. The mica plates may pass in succession through several pairs of spring-pressed corrugated rolls $e$ of the kind described, constituting a set of rolls, in order to increase the extent to which the laminæ or flakes of mica shall become loosened or separated from each other. Conveniently there may be three pairs of spring-pressed rolls in the set, as in the example shown in Fig. 2, the grooves $f$ having a pitch of about one and a quarter inches and a depth of about three-quarters of an inch, each pair of rolls being pressed together with sufficient force to insure that the mica plates in passing between them shall become bent to a considerable extent. The mica plates after being thus treated are again raised, as by an endless conveyer $k$, Fig. 2, upon which they fall from the last pair of rolls $e$ and are caused to fall by gravity into another chute $m$, Fig. 4, through which they are fed between one or more additional pairs of grooved or corrugated rolls $e'$, (three pairs are shown,) the grooves in which are of less pitch and depth than those in the preceding rolls $e$, whereby a further loosening of the laminæ of mica is effected. Conveniently the grooves in the rolls $e'$ in this case may have a pitch of about three-quarters of an inch and a depth of about half an inch, the rolls being pressed together either by gravity alone or by gravity and springs $h$ with sufficient force to insure that the mica plates in passing between them shall become bent to a considerable extent. The partly loosened and opened mica plates are again raised, as by an endless conveyer $n$, Fig. 4, and allowed to fall through a chute $o$, Fig. 5, and between one or more further pairs of grooved rolls $e^2$, (three pairs are shown,) that are pressed together and the grooves in which are of about the same pitch and depth as the grooves in the last preceding rolls $e'$. The number of times the mica plates are raised and allowed to fall between pairs of corrugated rolls and the pitch and depth of the grooves in such rolls can be varied to suit the particular quality of the mica plates being dealt with, the object sought in each case being to loosen or separate the laminæ or flakes of mica to a considerable extent.

The mica plates after being subjected to the preliminary bending treatment above described are then subjected to the flaking process proper. For this purpose the said plates are raised, as by an endless conveyer $p$, Fig. 5, and caused to fall flatwise through an inclined chute $q$ into an inclined chamber $r$, (hereinafter called for distinction the "flaking-chamber,") wherein they are caught by and subjected to the action of a blast of air, that causes the loosened laminæ of mica to become separated from each other to a greater or less extent and from the lower end of which the detached flakes of mica and the portions of mica plates the laminæ of which are only partly separated from each other are discharged, through a suitable outlet $s$, into a splitting and separating chamber $t$, wherein the partly-split mica plates undergo a further splitting treatment. To effect the flaking operation, the upper end of the inclined flaking-chamber $r$ is connected, as by a pipe $u$, to a device, such as a centrifugal or rotary fan or blower $v$, whereby air at a pressure of, say, about half a pound to the square inch is caused to enter such chamber and impinge in such a manner upon the mica plates falling into it as to separate the partly opened or loosened laminæ of mica from each other to a greater or less extent, and so produce the required flaked mica.

The lower end of the flaking-chamber $r$ may be provided with an enlarged cylindrical extension $w$, from one side of which the mica-outlet opening $s$ extends and in which is mounted to rotate a cylinder $x$, the circumference of which is provided with longitudinally-arranged vanes or blades $y$, against which the blast of air passing through the flaking-chamber $r$ acts. The cylinder is thereby caused to rotate in the direction indicated by the arrow and carry the more or less opened mica plates and the separated laminæ of mica around between it and the wall of the cylindrical extension $w$ and deliver them to the outlet $s$, whence they fall into the splitting and separating chamber $t$ below, the said mica plates and laminæ in their passage through the space $z$ between the rotary cylinder $x$ and cylindrical extension $w$ being presented edgewise to the blast of air, whereby the division of the plates into laminæ or flakes is facilitated.

The splitting and separating chamber $t$, into which the more or less flaked material falls, is made of comparatively large size and is divided into front and rear compartments 1 and 2, respectively, by an intermediate vertical wall or division 3, that serves as a baffle-plate and is capable of being adjusted vertically, as by weighted cords 4, shaft 5, and handle 6, so as to form between its upper edge $3^a$ and the top of the chamber $t$ and between the two compartments 1 and 2 thereof an opening 7, the height and size of which can be varied according to the fineness of the mica flakes required. The more or less flaked material in falling into the rear compartment 1 of the splitting and separating chamber will be acted upon by the current of air passing through such chamber in such a manner as to become further split thereby and so that the lighter portions of the mica laminæ or flakes will be carried forward by the air-current and delivered over the baffle-plate 3 into the front compartment 2, wherein they will be collected, while the heavier pieces of imperfectly-separated laminæ or flakes of mica will fall to the bottom of the rear compartment 1, from which they are removed and returned to one or more additional sets of corrugated rolls to be further subjected to an opening or loosening treatment. By increasing the height of the baffle-plate 3 the degree of fineness of the mica flakes obtained will be increased, while by reducing the height of the said baffle-plate a coarser quality of mica flakes will be obtained. To facilitate the removal of the imperfectly-divided material from the rear compartment 1 of the chamber $t$, the rear wall 8 of such compartment may, as shown, be made concave and slope downward toward a traverse-conveyer 9, arranged adjacent to the rear side of the baffle-plate 3, so that the said imperfectly-divided material will fall upon such conveyer and be automatically removed either continuously or intermittently, as may be desired.

The front compartment 2 of the chamber $t$ is provided at the top with an outlet covered with a screen 10, that will permit of the passage of the dust-laden air and very small flakes, but will prevent the escape of the larger flakes, which will become deposited in the bottom of the said front compartment. The dust-laden air, with the small flakes of mica, may be passed through a settling-chamber or be delivered into an open space where the particles of finely-divided mica and small flakes carried forward out of the separating-chamber by the air-current can be collected. The larger flakes, collected in the front compartment 1, may, when desired, be crimped by passing them between a pair of crimping-rollers.

Apparatus for carrying out the manufacture of flake mica in the manner hereinbefore described can be constructed and arranged in various ways. In the arrangement shown in Fig. 6 there are two inclined ways $b$, like that shown in Fig. 1, up each of which a wagon $a$, loaded with the dried mica plates, can be suitably hauled, as by the cord-and-pulley tackle $c$, and near the top and to one side of which is or may be arranged a dumping-platform or laterally-arranged chute, on or into which the mica plates can be delivered or directed toward the upper end of the downwardly and forwardly extending chute $d$ of the portion of the apparatus shown separately in Fig. 2, and near the lower end of which chute is the first set of corrugated rolls $e$, through which the mica plates from the wagons $a$ are allowed to fall by gravity, or the mica plates may be feed by hand from the wagons to the chute $d$. Traveling below the lowest pair of these rolls $e$ is the upwardly and forwardly inclined endless conveyer $k$, provided with transverse slats or projections $k'$, by which the partly bent and opened mica plates are carried upward and forward and delivered onto a transversely-arranged conveyer 12, which travels toward the top of the rearwardly and downwardly inclined chute $m$ of the portion of the apparatus shown separately in Fig. 4, and near the lower portion of which chute is the second set of corrugated rolls $e'$. Traveling below the sets of rolls $e'$ is another upwardly and forwardly inclined endless conveyer $n$, provided with transverse slats or projections $n^{\times}$, by which the mica plates after passing through the second set of rolls $e'$ are carried forward and upward and delivered into a doubly-inclined transversely-arranged chute 14, by which the material is divided into two streams and delivered into each of two backwardly and downwardly inclined chutes $o$ of apparatus of the kind shown separately in Fig. 5, provided near the lower portion with the third set of corrugated rolls $e^2$. Traveling below each of the third set of rolls $e^2$ is the upwardly and forwardly inclined endless conveyer $p$, that delivers the opened and loosened mica plates into the backwardly and downwardly inclined chute $q$, below the lower end of which is arranged a flaking-chamber $r$ and splitting and separating chamber $t$, constructed and arranged as hereinbefore described and provided with a fan $v$. At the opposite side of and beyond the first set of rolls $e$ and conveyer $k$ is a duplicate set of chutes with bending-rolls, conveyers, and flaking and separating chambers, comprising the chute $m'$, with set of bending-rolls $E'$ and upwardly and forwardly inclined conveyer $n'$, delivering onto a doubly-inclined transversely-arranged chute $14^a$, that delivers mica plates falling onto it in opposite directions into two chutes $o'$, each of which is provided with a set of bending-rolls $E^2$ and has an upwardly and forwardly inclined conveyer $p'$, delivering into a chute $q'$ of a flaking-chamber arranged above and in connection with a splitting and separating chamber $t'$, all of these parts being similar to those of the opposite or main set of chutes, bending-rolls, and conveyers hereinbefore described. Extending transversely across the lower end of the rear compartment of each of the splitting and separating chambers $t\ t'$ is a common endless band or conveyer 9, the upper part of which moves in the direction indicated by the arrow and the outer end of which terminates above the lower end of an upwardly and backwardly inclined endless conveyer 16, that delivers onto one end of a horizontal transversely-arranged endless carrier or conveyer 17, the other end of which delivers, it may be, through a chute, onto one end of a forwardly and upwardly inclined endless conveyer 18, that delivers into the upper part of the chute $m'$ of the duplicate set of bending and conveying apparatus. By the arrangement described the stream of mica plates fed into the first chute $d$ are subjected to successive bending in opposite directions in passing through the several sets of rolls $e\ e'\ e^2$, being gradually carried forward and finally divided into two streams that are delivered into the two flaking and separating chambers $r$ and $t$, wherein the partly-opened plates are split up more or less into flakes, which are separated from the heavier pieces of imperfectly-split mica and carried forward to the front compartments of the chambers $t$. The heavier pieces of imperfectly-split mica arrested in the rear compartments of the chambers $t\ t'$ fall onto the transverse conveyer 9, by which they are conveyed to the exterior of the chambers and delivered onto the conveyer 16, so as to be delivered by this conveyer and the conveyers 17 and 18 to the chute $m'$ of the duplicate set of bending, conveying, and flaking and separating apparatus, so as to be subjected to further treatment therein.

In some cases the transversely-arranged endless conveyer 12 may be replaced by a transversely-arranged doubly-inclined chute, like 14, arranged to deliver into the chutes $m\ m'$ of the two sets of bending, conveying, flaking, and separating apparatus beyond the conveyer $k$, so that the stream of mica plates delivered by such conveyer $k$ will be divided by such chute into two streams, each of which will afterward be again divided by the chutes 14 and 14ª into two streams, each of which passes on to its own flaking and separating chamber $t$ or $t'$. In this case the heavy pieces of imperfectly-split mica after removal from the chambers $t\ t'$ may be subjected to further treatment in separate apparatus. The width of the chutes and corresponding rolls and conveyers may, as shown, be of successively less width to suit the proportion of the original stream of mica plates passing through them.

In some cases instead of using corrugated rolls rolls formed with projections and corresponding spaces or recesses may be used for the purpose of acting upon the mica plates and opening and loosening the laminæ of which they are composed. Thus, as shown in Fig. 7, each roll may be formed with longitudinal rows of teeth or projections 20, spaced apart around the roll with spaces 21 between the teeth or projections in each row.

The mica flakes produced in the manner hereinbefore described can be used for various purposes. They may advantageously be used in the manufacture of non-conducting coverings, blocks, and slabs, according to the subject-matter of another application for Letters Patent filed by me of even date herewith, Serial No. 77,988.

It will be evident that various changes can be made in the details of construction of my apparatus without departing from the scope and spirit of my invention so long as the mode of operation described in the specification or the relative arrangement of parts shown in the drawings is preserved.

No claim is here presented to the improved method of manufacturing flake mica described in the preceding specification, but the claims are all drawn to apparatus adapted to carry out such method, claims for which will be made in another application.

What I claim is—

1. Apparatus for the manufacture of flake mica from mica plates, comprising one or more pairs of bending-rolls, means for conducting the mica plates between said rolls, a flaking-chamber provided with an inlet-chute inclined to the length of said chamber, means for conveying loosened and partly-opened mica plates from said rolls and introducing them into said inclined chute and flaking-chamber, means for forcing a blast of air into said flaking-chamber, and a splitting and separating chamber in communication with said flaking-chamber.

2. In apparatus for the manufacture of flake mica from mica plates, the combination with means for separating the laminæ of the mica, of a flaking-chamber having an inlet for partly loosened and opened mica plates, means for forcing a blast of air into said flaking-chamber, and a splitting and separating chamber in communication with said flaking-chamber, substantially as described.

3. In apparatus for the manufacture of flake mica from mica plates, the combination with means for separating the laminæ of the mica, of a flaking-chamber, means for introducing a blast of air into said flaking-chamber, and a splitting and separating chamber comprising two compartments that are in communication with each other and with said flaking-chamber and have a vertically-adjustable wall between them, substantially as described for the purpose specified.

4. In an apparatus for the manufacture of flake mica, the combination of a plurality of pairs of bending-rolls, a flaking-chamber, means for conveying plates of mica from one pair of rolls to another and from the last pair of the series to said chamber, means for creating a blast of air through said chamber, and means for moving the plates of mica through said chamber with the edges of the laminæ thereof exposed directly to the action of said blast.

5. In an apparatus for the manufacture of flake mica, the combination of means for opening up and separating the laminæ of mica plates, a flaking-chamber, means for creating a blast of air through said chamber, means for conveying the plates from said separating means to said chamber, and means for conveying the plates through said chamber with the separated edges of their laminæ exposed to the air-blast.

6. In an apparatus for the manufacture of flake mica, the combination of means for opening up and separating the laminæ of mica plates, a flaking-chamber, means for creating a blast of air through said chamber, means for conveying the plates from said separating means to said chamber, and a rotary carrier adapted to receive said plates and carry them through the chamber with the separated edges of their laminæ exposed to the air-blast.

7. An apparatus for reducing mica to flake form comprising means for loosening the laminæ of the mica, means for applying a blast to the mica after the laminæ have been loosened to separate the flakes, and means for automatically separating the flaked material from that which remains unflaked after the blast has been applied.

8. An apparatus for reducing mica to flake form comprising means for loosening the laminæ of the mica, means for applying a blast to the mica after the laminæ have been loosened to separate the flakes, means for automatically separating the flaked material from that which remains unflaked after the blast has been applied, and means for returning the mica which remains unflaked to the loosening means.

9. An apparatus for reducing mica to flake form comprising means for bending or corrugating the sheets to loosen and open the laminæ, means for applying a blast to the mica after it has been opened to separate the flakes, and means for automatically separating the flaked material from that which remains unflaked after the blast has been applied.

10. An apparatus for reducing mica to flake form comprising means for bending or corrugating the sheets to loosen and open the laminæ, means for applying a blast to the mica after it has been opened to separate the flakes, means for automatically separating the flaked material from that which remains unflaked after the blast has been applied, and means for returning the unflaked material to the bending means.

In testimony whereof I affix my signature in presence of two witnesses.

HENRY COLBECK MICHELL.

Witnesses:
ROBERT WATSON,
C. A. NEALE.